(12) United States Patent
Lee et al.

(10) Patent No.: US 9,528,832 B2
(45) Date of Patent: Dec. 27, 2016

(54) POWER-FREE GYROSCOPE USING SURFACE ACOUSTIC WAVE, AND WIRED/WIRELESS METHOD FOR MEASURING ANGULAR VELOCITY

(71) Applicants: Kee Keun Lee, Gyeonggi-do (KR); Sang Sik Yang, Seoul (KR); Hae Kwan Oh, Gyeonggi-do (KR)

(72) Inventors: Kee Keun Lee, Gyeonggi-do (KR); Sang Sik Yang, Seoul (KR); Hae Kwan Oh, Gyeonggi-do (KR)

(73) Assignee: AJOU UNIVERSITY INDUSTRY COOPERATION FOUNDATION, Gyeonggi-Do (KR)

( * ) Notice: Subject to any disclaimer, the term of this patent is extended or adjusted under 35 U.S.C. 154(b) by 236 days.

(21) Appl. No.: 14/369,300

(22) PCT Filed: Dec. 31, 2012

(86) PCT No.: PCT/KR2012/011842
§ 371 (c)(1),
(2) Date: Jun. 27, 2014

(87) PCT Pub. No.: WO2013/100740
PCT Pub. Date: Jul. 4, 2013

(65) Prior Publication Data
US 2015/0000399 A1    Jan. 1, 2015

(30) Foreign Application Priority Data

Dec. 30, 2011    (KR) .................. 10-2011-0146835

(51) Int. Cl.
*G01C 19/56*        (2012.01)
*G01C 19/5698*      (2012.01)
(Continued)

(52) U.S. Cl.
CPC .......... *G01C 19/5698* (2013.01); *G01C 19/56* (2013.01); *G01C 19/5684* (2013.01); *G01C 19/58* (2013.01); *G01P 3/44* (2013.01)

(58) Field of Classification Search
CPC ....................................................... G01C 19/56
(Continued)

(56) References Cited

U.S. PATENT DOCUMENTS 6,516,665 B1 * 2/2003 Varadan ............ G01C 19/5698
                                                      310/313 R
8,181,521 B2 * 5/2012 Arakawa ............ G01C 19/5698
                                                         73/504.01

FOREIGN PATENT DOCUMENTS

JP    2009-133635    6/2009    ............. G01C 19/56
KR    10-2009-0016960    2/2009    ............. G01C 19/56
(Continued)

OTHER PUBLICATIONS

PCT Translation PCT/KR2012/011842 Written Opinion of the International Search Authority, Apr. 25, 2013, 1-10 pgs.*

(Continued)

*Primary Examiner* — Clayton E Laballe
*Assistant Examiner* — Kevin Butler
(74) *Attorney, Agent, or Firm* — Harness, Dickey & Pierce, P.L.C.

(57) ABSTRACT

Provided is a gyroscope using a surface acoustic wave (SAW) and an angular velocity measurement method. The gyroscope includes an SAW resonator generating a first SAW, generating Coriolis force using an interaction between a velocity component of the first SAW and applied angular velocity on a metallic dot layer disposed in a certain position, and generating a second SAW using the Coriolis force, an SAW sensing oscillator generating a third SAW and receiving a fourth SAW, which is the third SAW reflected (Continued)

and returning after causing interference due to the second SAW, and a measurement device measuring a level of the applied angular velocity using variations in time of receiving the fourth SAW.

9 Claims, 9 Drawing Sheets

(51) Int. Cl.
G01C 19/58 (2006.01)
G01C 19/5684 (2012.01)
G01P 3/44 (2006.01)

(58) Field of Classification Search
USPC .................................................... 73/504.01
See application file for complete search history.

(56) References Cited

FOREIGN PATENT DOCUMENTS

KR 10-2010-0098259 9/2010 ............. G01C 19/56
KR 1020100098259 * 9/2010 ............. G01C 19/56

OTHER PUBLICATIONS

PCT Translation PCT/KR2012/011842 International Preliminary Report on Patentability, Apr. 25, 2013, 1-11 pgs.*
Hae-Kwan et al., The development of a wireless Love wave biosensor on 41 YX LiNb03, Jan. 13, 2009, 1-10 pgs.*
Haekwan et al., 'Gyroscopes based on surface acoustic waves', Micro and Nano Systems Letters, 2015, pp. 1-10.*
Jae Geun, Oh, "SAW based passive radio sensors using energy gatherer", Sogang University, Thesis for Master's degree, 2005, pp. 83-91 and figure 3.12.
Wen Wang et al., "Novel SAW-based pressure sensor on 41 °YXLiNbO3", Journal of IEEK 2006, TC part, vol. 43, No. 1, pp. 33-40.
Min woo, Nam et al, "Development of wireless/battery-free Love wave biosensor" Journal of 2009 Summer Conference, KIEE, 2009, pp. 1545-1546.
International Search Report (ISR) in PCT/KR2012/011842, dated Apr. 25, 2013.

* cited by examiner

POWER-FREE GYROSCOPE USING SURFACE ACOUSTIC WAVE, AND WIRED/WIRELESS METHOD FOR MEASURING ANGULAR VELOCITY

CROSS-REFERENCE TO RELATED APPLICATIONS

This application is a national phase application of PCT Application No. PCT/KR2012/011842, filed on Dec. 31, 2012, which claims the benefit and priority to Korean Patent Application No. 10-2011-0146835, filed Dec. 30, 2011. The entire disclosures of the applications identified in this paragraph are incorporated herein by references.

FIELD

The present disclosure relates to a gyroscope and a method of measuring angular velocity, and more particularly, to a non-powered gyroscope using a surface acoustic wave (SAW) capable of being wirelessly driven without power and a wire or wireless angular velocity measurement method.

BACKGROUND

A gyroscope is a sensor for measuring a rotation rate or a rotation angle in inertial space. For several decades, research and development on optical gyroscopes have been performed. However, recently, development on low-price microminiature gyroscopes based on micro-electro-mechanical systems (MEMS) technology draws attention.

The purpose of developing micro gyroscopes is not only simply replacing general gyros for guidance, controlling, and differential global positioning system but also providing innovative weapon system impossible without MEMS technology such as smart projectiles, microminiature unmanned aerial vehicles, and micro robots.

Particularly, since a gyroscope sensor, which is an essential component of a precision strike weapon system such as rocket-firing inducing bombs and tank smart projectiles, should satisfy extreme condition such as a microminiature size less than about 50 mm3, high impact resistance from about 20,000 to about 50,000 g, and high mobility of about 10,000 deg/sec due to an application system thereof, it is impossible to embody the gyroscope sensor using general large-sized and high-priced mechanical or optical gyroscopes.

Due to this, the necessity of surface acoustic wave (SAW)-based gyroscopes has increased. For example, Korean Patent Registration No. 10-1017822 discloses an SAW-based gyroscope, which was filed by the present applicant. However, the gyroscope described above is incapable of wirelessly transmitting and receiving a signal, which needs power, and measures angular velocity only using a complicated measurement device.

SUMMARY

The present invention provides a non-powered gyroscope using a surface acoustic wave (SAW), which is capable of measuring angular velocity using a wirelessly received signal although not being connected to a power source and does not need a measurement device having a complicated structure.

The present invention also provides a wire or wireless angular velocity measurement method for measuring applied angular velocity using the gyroscope.

According to an aspect of the present invention, a gyroscope using a surface acoustic wave (SAW), includes an SAW resonator generating a first SAW, generating Coriolis force using an interaction between a velocity component of the first SAW and applied angular velocity on a metallic dot layer disposed in a certain position, and generating a second SAW using the Coriolis force, an SAW sensing oscillator generating a third SAW and receiving a fourth SAW, which is the third SAW reflected and returning after causing interference due to the second SAW, and a measurement device measuring a level of the applied angular velocity using variations in time of receiving the fourth SAW.

The SAW sensing oscillator may not be connected to a power source and may wirelessly perform transmission and reception with the measurement device.

The SAW sensing oscillator may include a plurality of reflectors transmitting a reference SAW to an input/output electrode by reflecting the third SAW when the angular velocity is not applied and transmitting the fourth SAW to the input/output electrode by reflecting the third SAW causing the interference due to the second SAW when the angular velocity is applied and the input/output electrode generating the third SAW using a radio frequency (RF) signal wirelessly received and receiving and converting one of the reference SAW and the fourth SAW into an electric signal.

The measurement device may measure the level of the applied angular velocity using a time difference between times when the input/output electrode receives the reference SAW and the fourth SAW reflected by the same reflector among the reflectors.

The SAW resonator may transmit the second SAW to an interference region between two adjacent reflectors among the reflectors in a direction not parallel to the third SAW.

Among the reflectors located in a propagation direction of the third SAW, at least one reflector located after the interference region, to which the second SAW is transmitted, may compensate an error caused by temperatures.

The input/output electrode may be a single phase unidirectional transducer (SPUDT).

The SAW sensing oscillator may wirelessly receive the RF signal and may wirelessly transmit the electric signal converted from one of the reference SAW and the fourth SAW to the measurement device.

The metallic dot layer may be located on an antinode of the first SAW.

The SAW resonator may be a 2-port type including an input electrode, an interdigital transducer (IDT), on one end and an output electrode, an IDT, on another end, in which the metallic dot layer is disposed between the input electrode and the output electrode.

The SAW resonator may receive driving energy from a voltage-controlled oscillator (VCO).

According to another aspect of the present invention, a method of measuring angular velocity using an SAW includes generating a first SAW and a third SAW, respectively, generating Coriolis force using an interaction between a velocity component of the first SAW and applied angular velocity on a metallic dot layer disposed in a certain position, generating a second SAW using the Coriolis force, receiving a fourth SAW, which is the third SAW reflected and returning after causing interference due to the second SAW, and measuring a level of the applied angular velocity using variations in time of receiving the fourth SAW.

The generating of the first and third SAWs may include generating the third SAW using an RF signal wirelessly received without receiving power, and the measuring of the level of the angular velocity may include measuring the level of the applied angular velocity by receiving an electric signal converted from the fourth SAW using a measurement device.

The method may further include generating a reference SAW, which is the third SAW reflected and returning, when the angular velocity is not applied. Herein, the measuring the level of the angular velocity may be measuring the level of the applied angular velocity using a time difference between times of receiving the reference SAW and the fourth SAW reflected by the same reflector among reflectors reflecting one of the reference SAW and the fourth SAW.

An output terminal generating and outputting the third SAW and an input terminal receiving the fourth SAW may be the same with each other.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
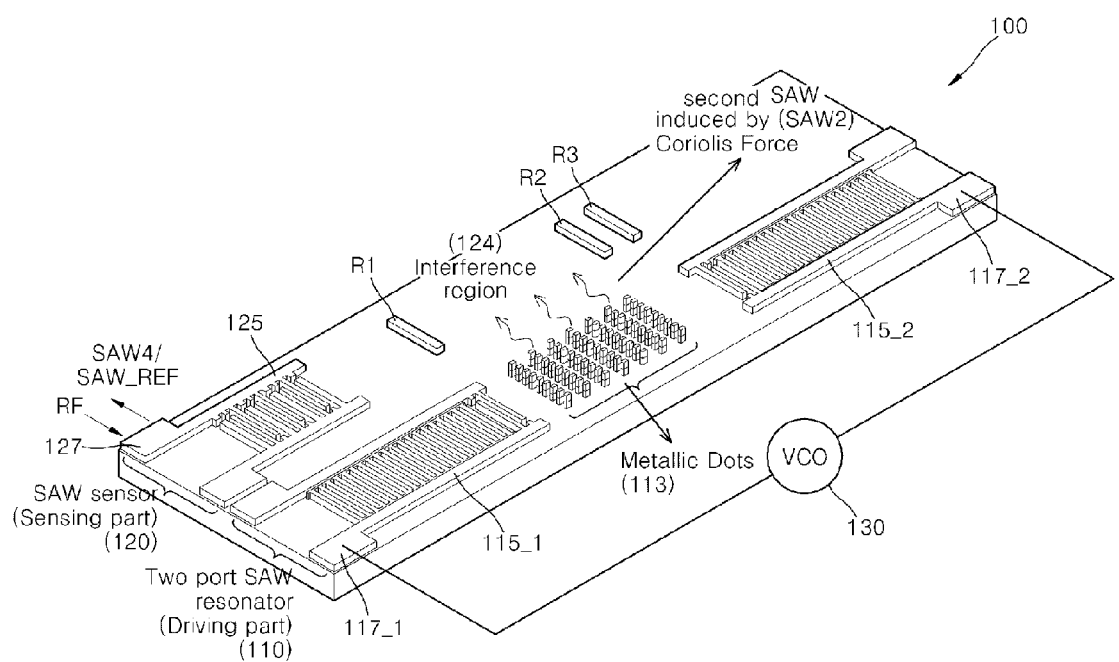
FIG. 1 is a schematic perspective view a gyroscope according to an embodiment of the present invention.

To fully understand advantages in operation and objects achieved by embodiments of the present invention, it is necessary to refer to the attached drawings illustrating exemplary embodiments of the present invention and contents disclosed in the drawings.

Hereinafter, the exemplary embodiments of the present invention will be described in detail with reference to the attached drawings. In the drawings, like reference numerals refer to like elements.

FIG. 1 is a schematic perspective view of a gyroscope 100 according to an embodiment of the present invention.

Referring to FIG. 1, the gyroscope 100 may include a surface acoustic wave (SAW) resonator 110, an SAW sensing oscillator 120, and a measurement device (not shown).

The SAW resonator 110 may be formed of two SAW delay lines. The SAW sensing oscillator 120 may be formed of one SAW delay line.

An SAW delay line structure indicates a structure for delaying a signal through propagation velocity of piezoelectric material, in which an electric signal having EM of about $3*10^8$ m/s applied to an input terminal of an SAW oscillator is propagated between an input terminal and an output terminal while being converted into a mechanical signal of about 3900 m/s varying with a used piezoelectric substrate and is converted again into an electric signal having EM of about $3*10^8$ m/s at the output terminal.

The SAW resonator 110 is a 2-port type, in which a metallic dot array 113 is present in a cavity between an input electrode, an interdigital transducer (IDT), 115-1 and an output electrode, an IDT, 115-2. The metallic dot array 113 is located on an antinode of a standing wave.

128° YX LiNbO$_3$ used as a substrate generates a Rayleigh wave. The generated Rayleigh wave has a form of elliptical oscillation in a vertical plane including a propagation direction and has a particle velocity component (velocity in a Z-axis direction) on a surface thereof at the antinode.

When an angular velocity $\Omega$ in an X-axis direction is applied form the outside of the SAW resonator 110, a metallic dot layer, whose mass is m, generates Coriolis force F, which is $2*m*(v*\Omega)$ in a Y-axis direction. Herein, m indicates the mass of the metallic dot layer, v indicates the velocity of an SAW, and $\Omega$ indicates external angular velocity.

Since being designed as a multilayer structure to generate Coriolis force, general gyroscopes are vulnerable to impact. On the contrary, since being capable of generating Coriolis force only using a metallic dot layer, the gyroscope 100 does not need a structure and is strong against impact.

Due to the generated Coriolis force, a second SAW SAW2 is generated in the SAW resonator 110 and flows through an interference region 124 between two adjacent reflectors R1 and R2 among reflectors R1, R2, and R3.

The SAW resonator 110 may receive driving energy from a voltage-controlled oscillator (VCO) 130. That is, a receiver 117-1 and a transmitter 117-2 of the SAW resonator 110 may be connected to both ends of the VCO 130.

The SAW sensing oscillator 120 may generate a third SAW using a received radio frequency (RF) signal RF and may receive a fourth SAW SAW4, which is the third SAW reflected by the reflectors R2 and R3 and returning after causing interference due to the second SAW SAW2. When the angular velocity is not applied, the reflectors R1, R2, and R3 may reflect the third SAW and may transmit a reference SAW SAW_REF to an input/output electrode 125. When the angular velocity is applied, the reflectors R1, R2, and R3 may reflect the third SAW, thereby transmitting the fourth SAW SAW4 to the input/output electrode 125. The reference SAW SAW_REF or the fourth SAW SAW4 reflected by the reflectors R1, R2, and R3 will be described in detail with reference to FIG. 2. Also, among the reflectors R1, R2, and R3 located in a propagation direction of the third SAW (from the left to the right in FIG. 1), the reflectors R2 and R3 located after the interference region 124, in which the second SAW SAW2 is propagated, may compensate errors caused by temperatures. Although there are shown three reflectors in FIG. 1, the number of reflectors is not limited thereto but another number of reflectors may be provided.

The input/output electrode 125 may generate the third SAW using the received RF signal RF and may receive and convert one of the reference SAW SAW_REF and the fourth SAW SAW4 into an electric signal. That is, since the SAW sensing oscillator 120 may have one input/output electrode 125, although power is not additionally applied, the SAW sensing oscillator 120 may generate the third SAW using the RF signal RF. The input/output electrode 125 may be a single phase unidirectional transducer (SPUDT).

A transceiver 127 may receive an RF signal RF from one of the measurement device and a certain device and may transmit an electric signal converted from one of the reference SAW SAW_REF and the fourth SAW SAW4. The transceiver 127 may be an antenna for performing wireless communication.

The measurement device may measure a level of the applied angular velocity using variations in time of receiving the fourth SAWs SAW4 reflected from the reflectors R1, R2, and R3, respectively. For example, the level of the applied angular velocity may be measured using a time difference between the reference SAW SAW_REF and the fourth SAW SAW4 reflected from the reflector R2. That is, the level of the applied angular velocity may be measured using an electric signal converted from the reference SAW SAW_REF and an electric signal converted from the fourth SAW SAW4 received from the input/output electrode 125, which will be described in detail with reference to FIG. 2. According to the embodiment, since the level of the applied angular velocity may be measured using the electric signal converted from the reference SAW SAW_REF and the electric signal converted from the fourth SAW SAW4, the level of the angular velocity may be simply measured without a general measurement device having a complicated circuit.

Figure 2:
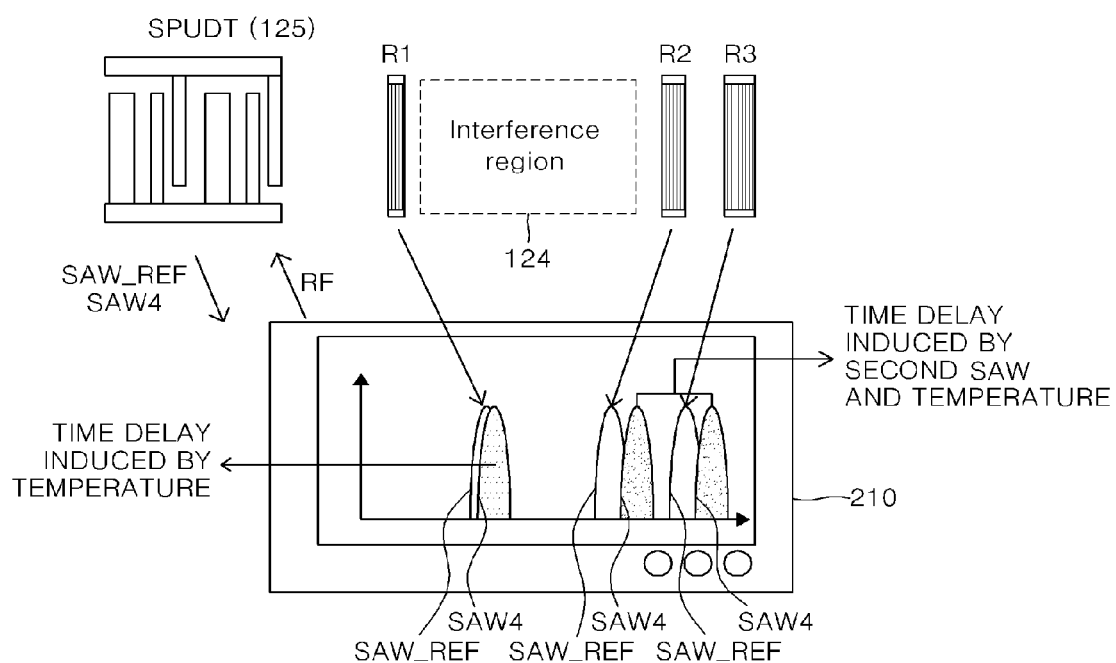
FIG. 2 is a diagram illustrating a method of measuring the level of applied angular velocity using a measurement device.

FIG. 2 is a diagram illustrating a method of measuring the level of applied angular velocity using a measurement device 210.

Referring to FIGS. 1 and 2, there is described a case, in which the input/output electrode 125 vis a SPUDT and includes three reflectors R1, R2, and R3. It may be known that a reference SAW SAW_REF and the fourth SAW SAW4 on the left of waveforms of the measurement device 210 are electric signals converted from the reference SAW SAW_REF and the fourth SAW SAW4 reflected by the reflector R1 and a time difference is generated by temperatures as shown in FIG. 2. Also, It may be known that the reference SAW SAW_REF and the fourth SAW SAW4 in the middle of the waveforms of the measurement device 210 are electric signals converted from the reference SAW SAW_REF and the fourth SAW SAW4 reflected by the reflector R2 and a time difference is generated by interference and temperatures as shown in FIG. 2. Also, It may be known that the reference SAW SAW_REF and the fourth SAW SAW4 on the right of the waveforms of the measurement device 210 are electric signals converted from the reference SAW SAW_REF and the fourth SAW SAW4 reflected by the reflector R3 and a time difference is generated by interference and temperatures as shown in FIG. 2.

Among the waveforms described above, the applied angular velocity may be measured using one of the time difference between the electric signals converted from the reference SAW SAW_REF and the fourth SAW SAW4 reflected by the reflector R2 and the time difference between the electric signals converted from the reference SAW SAW_REF and the fourth SAW SAW4 reflected by the reflector R3.

Figure 3:
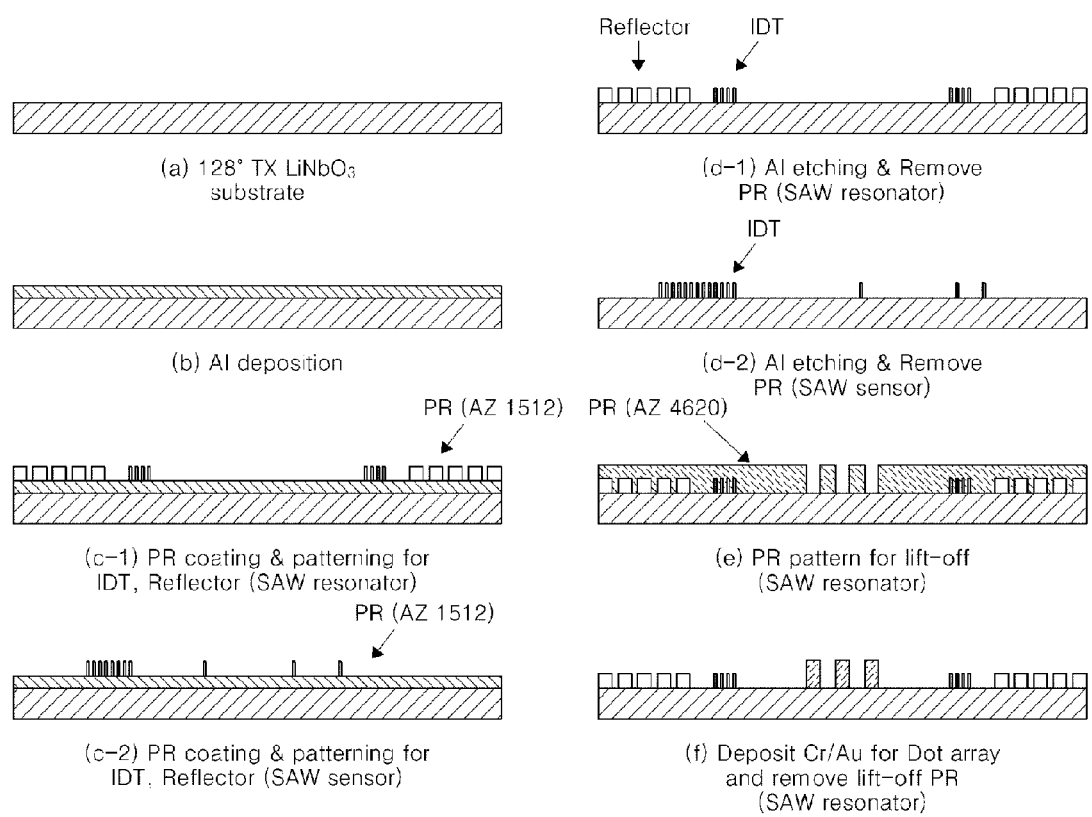
FIG. 3 is a diagram illustrating a process of manufacturing the gyroscope of FIG. 1.

FIG. 3 is a diagram illustrating a process of manufacturing the gyroscope 100.

Referring to FIGS. 1 to 3, aluminum Al may be deposited on 128° YX LiNbO$_3$ considering a mass loading effect (b), an SAW resonator and an SAW sensing oscillator including reflectors may be manufactured using photolithography (c-1, c-2, d-1, and d-2), and a metallic dot layer may be formed by depositing dense Cr/Au through a lift-off process (e and f).

Figure 4:
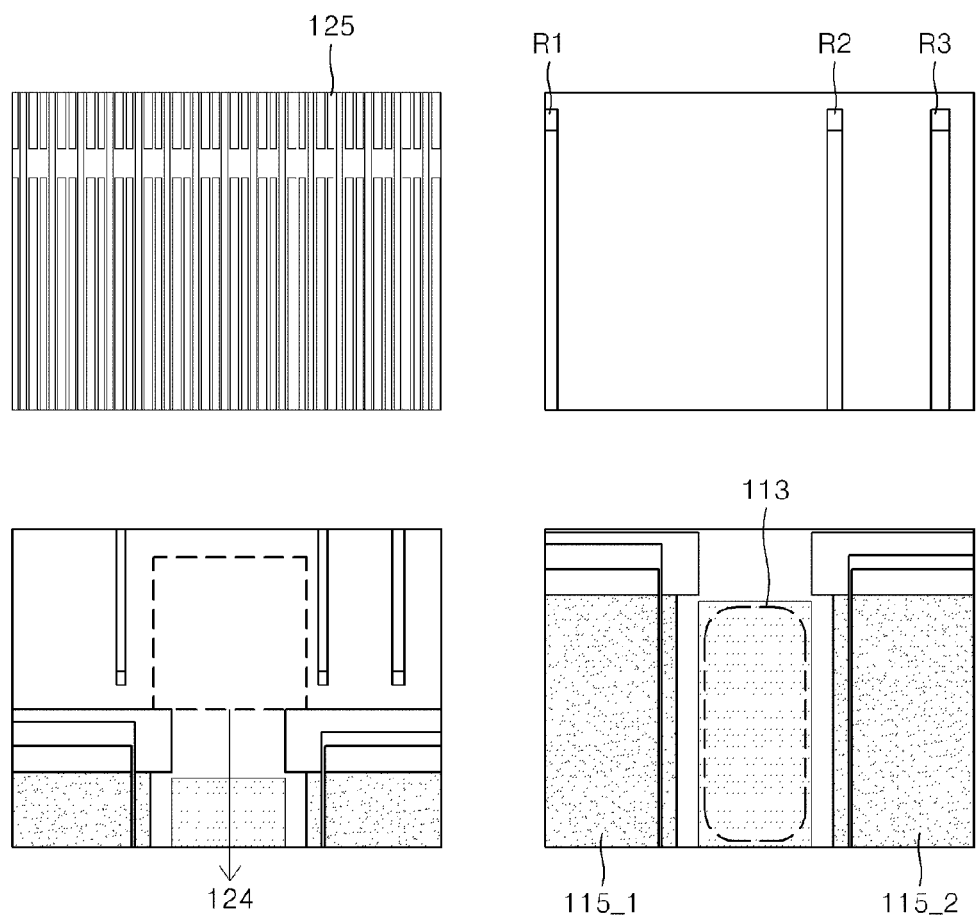
FIG. 4 illustrates photographs of elements of the gyroscope of FIG. 1.

FIG. 4 illustrates photographs of elements of the gyroscope 100.

Referring to FIGS. 1 to 4, in FIG. 4, there are shown photographs of the input/output electrode 125 of the SAW sensing oscillator 120, a plurality of the reflectors R1, R2, and R3, the interference region 124, in which the second SAW SAW2 is propagated, the input electrode 115-1 and the output electrode 115-2 of the SAW resonator 110, and the metallic dot layer 113.

Figure 5:
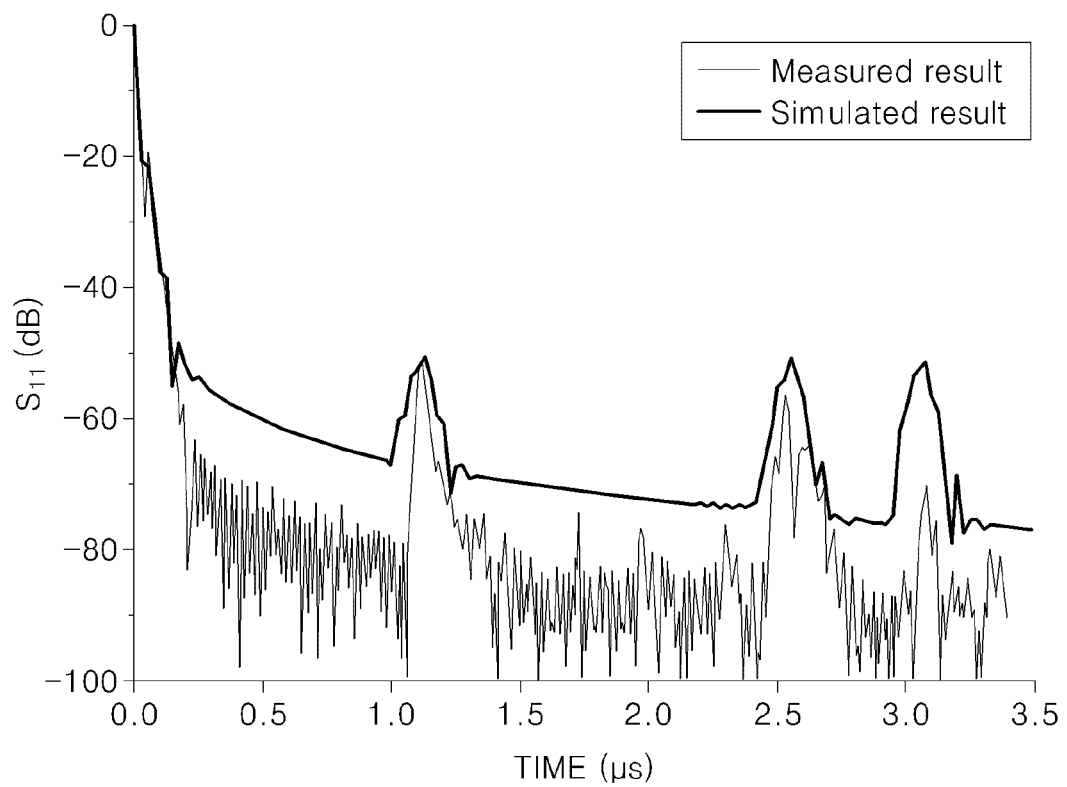
FIG. 5 illustrates a measurement result and a simulation result using the gyroscope of FIG. 1.

FIG. 5 illustrates a measurement result and a simulation result using the gyroscope 100.

Referring to FIGS. 1 to 5, $S_{11}$ of a Y-axis indicates a ratio between the third SAW and the reflected fourth SAW SAW4 and an X-axis indicates time. In one of the measurement result and the simulation result in FIG. 5, a peak value of S11 may be the time when the fourth SAW SAW4 reflected by one of the reflectors R1, R2, and R3 is received by the SAW sensing oscillator 120. In FIG. 5, the fourth SAW SAW4 reflected by the reflector R1 is received by the SAW sensing oscillator 120 at about 1.2 μs, the fourth SAW SAW4 reflected by the reflector R2 is received by the SAW sensing oscillator 120 at about 2.6 μs, and the fourth SAW SAW4 reflected by the reflector R3 is received by the SAW sensing oscillator 120 at about 3.1 μs.

Figure 6:
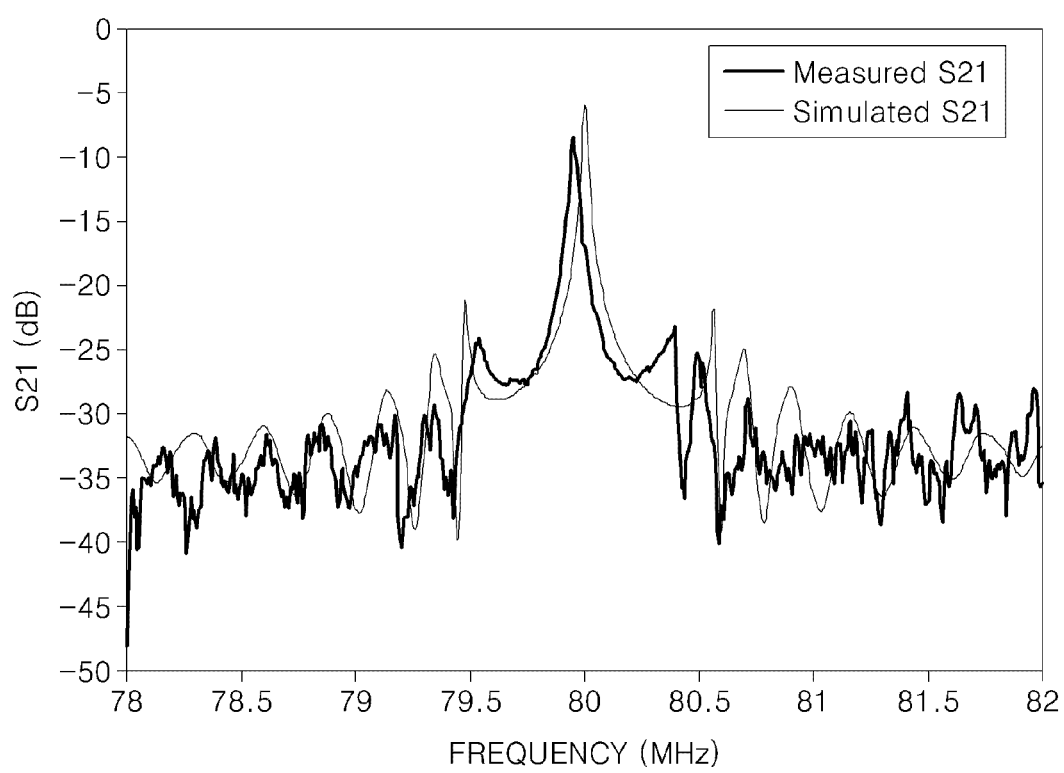
FIG. 6 illustrates a ratio between input and output of a first surface acoustic wave (SAW) in an SAW resonator shown in FIG. 1.

FIG. 6 illustrates a ratio between input and output of the first SAW in the SAW resonator 110.

Referring to FIGS. 1 to 6, $S_{21}$ of a Y-axis indicates a ratio between a transmitted first SAW and a received first SAW of the SAW resonator 110 and an X-axis indicates frequency. Referring to FIG. 6, it may be known that the gyroscope 100 efficiently operates with a frequency of 80 MHz.

Figure 7:
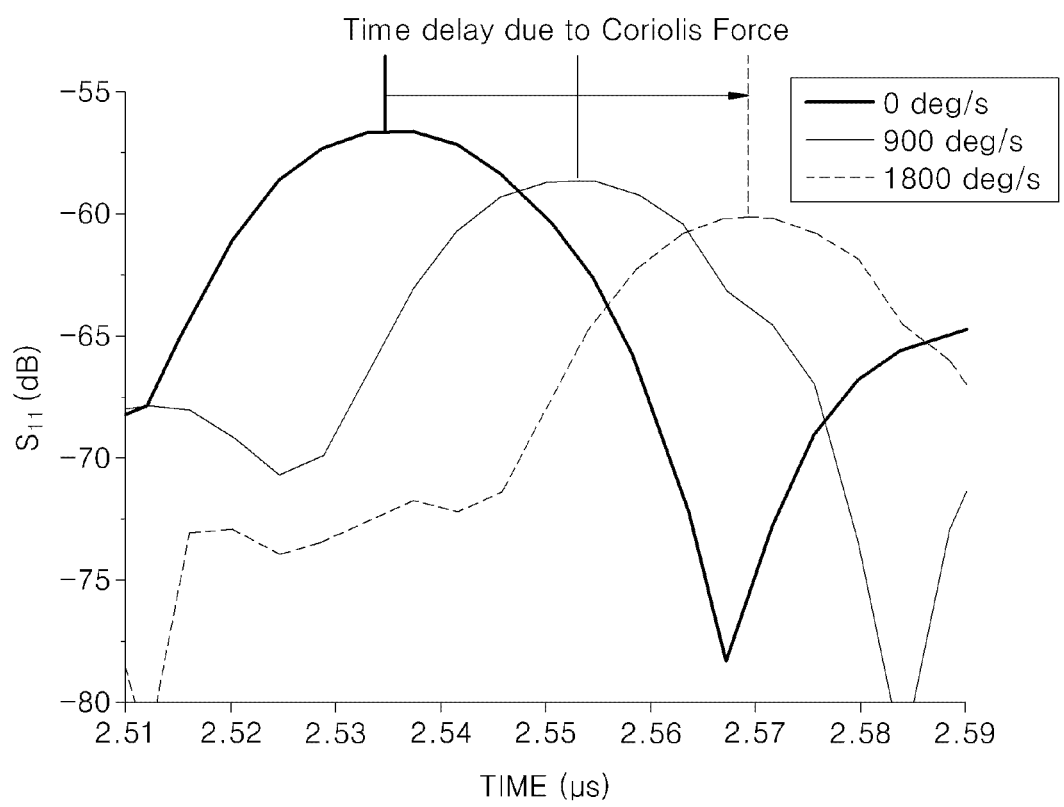
FIG. 7 illustrates measurement results and simulation results of the gyroscope of FIG. 1 according to applied angular velocity.
Figure 8:
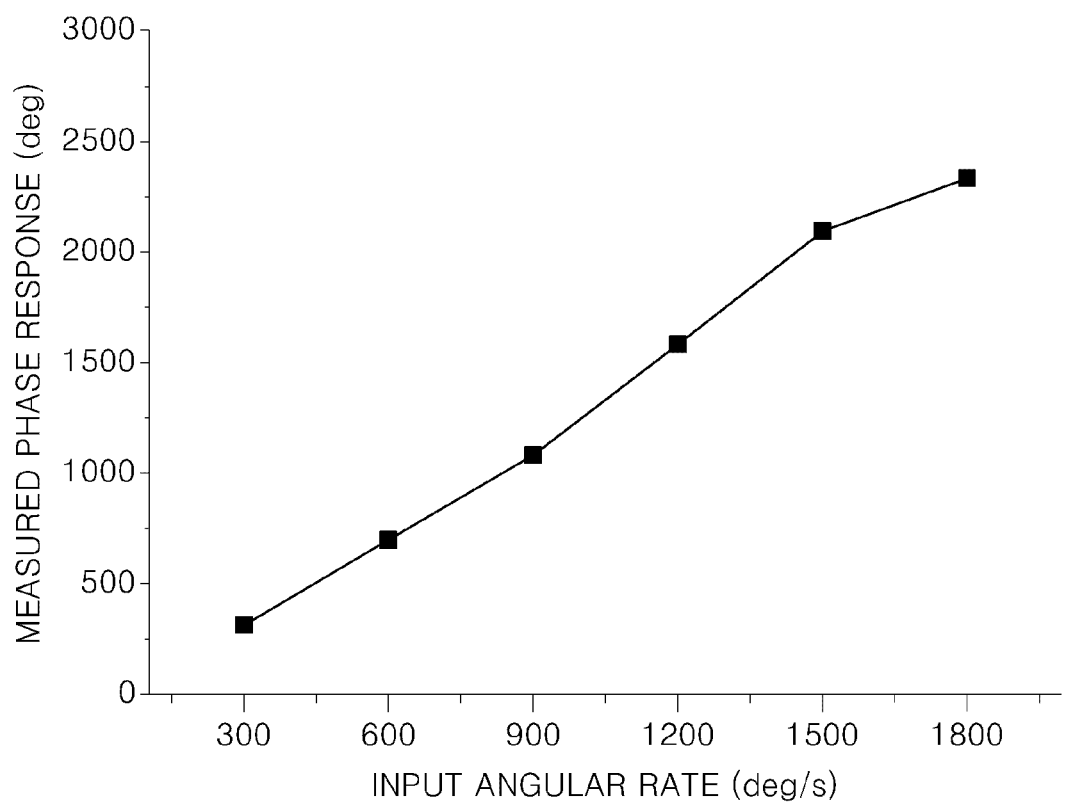
FIG. 8 illustrates a sensitivity result of the gyroscope of FIG. 1 according to angular velocity.

FIG. 7 illustrates measurement results and simulation results of the gyroscope 100 according to applied angular velocity. FIG. 8 illustrates a sensitivity result of the gyroscope of FIG. 1 according to angular velocity.

Referring to FIGS. 1 to 8, when being 0 deg/sec, the angular velocity is not applied, in which a waveform thereof indicates a ratio between the third SAW and the reflected reference SAW SAW_REF. When the angular velocity is 900 deg/sec, a waveform indicates a ratio between the third SAW and the reflected fourth SAW SAW4. When the angular velocity is 1800 deg/sec, a waveform indicates a ratio between the third SAW and the reflected fourth SAW SAW4. In FIG. 7, the reflected reference SAW SAW_REF and the reflected fourth SAW SAW4 are reflected by the same reflector, which is one of the reflectors R1, R2, and R3. Referring to FIG. 8, as the angular velocity of the X-axis increases, a measured phase corresponding to the time difference increases, in which angular velocity corresponding to the time difference may be known. Accordingly, the level of the applied angular velocity may be measured using variations in time of receiving the fourth SAW SAW4, that is, a time difference between the reference SAW SAW_REF and the fourth SAW SAW4.

Figure 9:
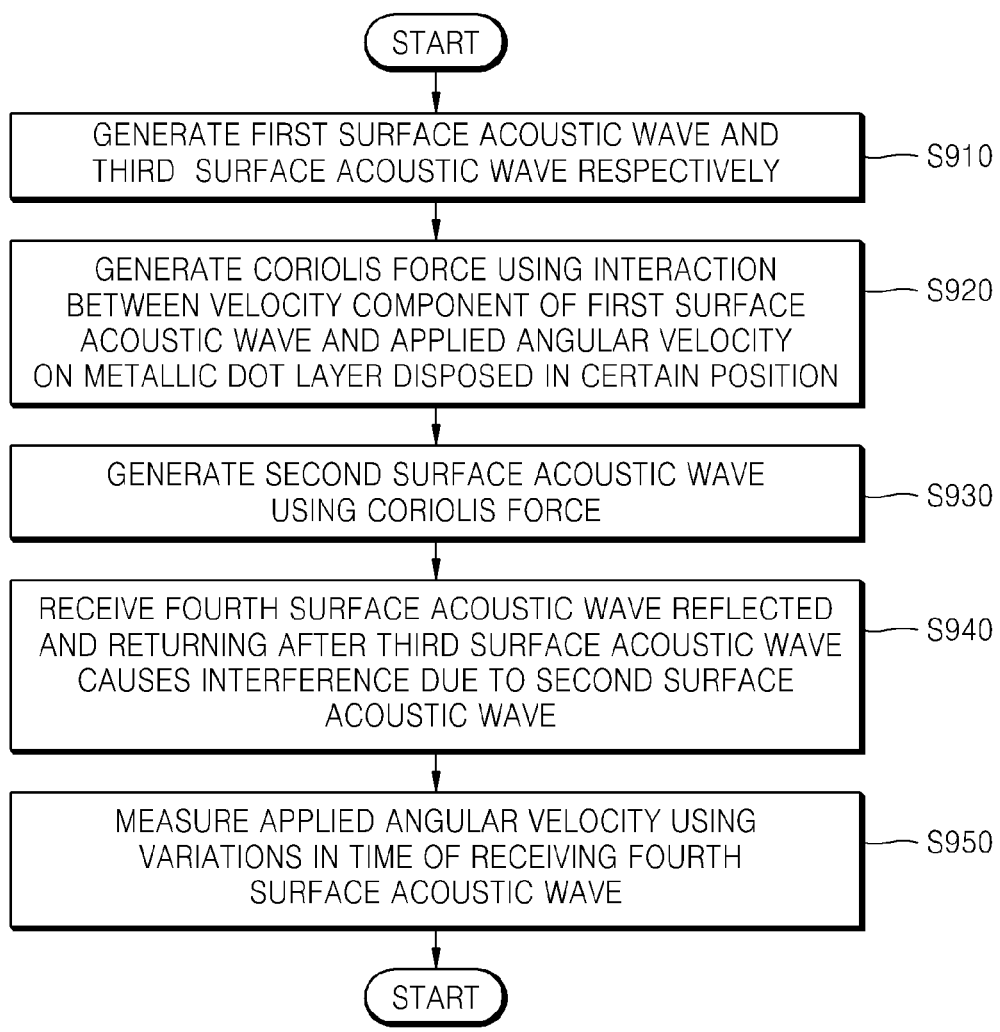
FIG. 9 is a method of measuring angular velocity using SAWs according to an embodiment of the present invention.

FIG. 9 is a method of measuring angular velocity using SAWs according to an embodiment of the present invention.

Referring to FIGS. 1 to 9, the SAW resonator 110 may generate a first SAW and the SAW sensing oscillator 120 may generate a third SAW (S910). Coriolis force may occur due to an interaction between a velocity component of the first SAW and applied angular velocity on the metallic dot layer 113 (S920). A second SAW SAW2 may be generated by the Coriolis force (S930). The SAW sensing oscillator 120 may receive a fourth SAW SAW4 reflected by a reflector and returning after the third SAW causes interference due to the second SAW (S940). The measurement device 210 may measure the level of the applied angular velocity using variations in time of receiving the fourth SAW SAW4. Since respective operations have been described with reference to FIGS. 1 to 8, a detailed description thereof will be replaced by the description with reference to FIGS. 1 to 8.

According to the embodiments, the non-powered gyroscope using the SAW and the wired or wireless angular velocity measurement method may be driven without power by configuring a terminal generating and outputting an SAW to be identical to a terminal receiving an SAW causing interference and reflected, may generate an SAW using an RF signal wirelessly received, and may wirelessly transmit the reflected SAW to a measurement device. Also, since angular velocity is measured using variations in time of the reflected SAW, a measurement device having a complicated structure is unnecessary and an error caused by temperatures may be compensated using a plurality of reflectors. Also, since there is no mobile structure in the gyroscope and only an SAW is propagated along a surface of piezoelectric material is used, the gyroscope has strong durability, high impact resistance, and a microminiature size, which may easily be manufactured using two-dimensional surface machining technology.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A gyroscope using a surface acoustic wave (SAW), comprising:
    an SAW resonator generating a first SAW, generating Coriolis force using an interaction between a velocity component of the first SAW and applied angular velocity on a metallic dot layer disposed in a certain position, and generating a second SAW using the Coriolis force;
    an SAW sensing oscillator generating a third SAW and receiving a fourth SAW, which is the third SAW reflected and returning after causing interference due to the second SAW; and
    a measurement device measuring a level of the applied angular velocity using variations in time of receiving the fourth SAW,
    wherein the SAW sensing oscillator comprises:
    a plurality of reflectors transmitting a reference SAW to an input/output electrode by reflecting the third SAW when the angular velocity is not applied and transmitting the fourth SAW to the input/output electrode by reflecting the third SAW causing the interference due to the second SAW when the angular velocity is applied; and
    the input/output electrode generating the third SAW using a radio frequency (RF) signal wirelessly received and receiving and converting one of the reference SAW and the fourth SAW into an electric signal,
    wherein the SAW resonator transmits the second SAW to an interference region between two adjacent reflectors among the reflectors in a direction not parallel to the third SAW.

2. The gyroscope of claim 1, wherein the SAW sensing oscillator is not connected to a power source and wirelessly performs transmission and reception with the measurement device.

3. The gyroscope of claim 1, wherein the measurement device measures the level of the applied angular velocity using a time difference between times when the input/output electrode receives the reference SAW and the fourth SAW reflected by the same reflector among the reflectors.

4. The gyroscope of claim 1, wherein, among the reflectors located in a propagation direction of the third SAW, at least one reflector located after the interference region, to which the second SAW is transmitted, compensates an error caused by temperatures.

5. The gyroscope of claim 1, wherein the input/output electrode is a single phase unidirectional transducer (SPUDT).

6. The gyroscope of claim 1, wherein the SAW sensing oscillator wirelessly receives the RF signal and wirelessly transmits the electric signal converted from one of the reference SAW and the fourth SAW to the measurement device.

7. The gyroscope of claim 1, wherein the metallic dot layer is located on an antinode of the first SAW.

8. The gyroscope of claim 1, wherein the SAW resonator is a 2-port type including an input electrode, an interdigital transducer (IDT), on one end and an output electrode, an IDT, on another end, in which the metallic dot layer is disposed between the input electrode and the output electrode.

9. The gyroscope of claim 1, wherein the SAW resonator receives driving energy from a voltage-controlled oscillator (VCO).

* * * * *